United States Patent [19]

Rys-Sikora

[11] 4,394,459

[45] Jul. 19, 1983

[54] FAST-CURING FOAMABLE COMPOSITION BASED ON ETHYLENE TERPOLYMERS

[75] Inventor: John Rys-Sikora, Bel Aire, Md.

[73] Assignee: E. I. Du Pont de Nemours & Co., Wilmington, Del.

[21] Appl. No.: 414,452

[22] Filed: Sep. 2, 1982

Related U.S. Application Data

[62] Division of Ser. No. 303,479, Sep. 18, 1981, Pat. No. 4,370,423.

[51] Int. Cl.³ .............................................. C08J 9/06
[52] U.S. Cl. .................................... 521/84; 521/92; 521/95; 521/189; 521/909; 521/149
[58] Field of Search ............... 521/189, 92, 95, 149, 521/84

[56] References Cited

U.S. PATENT DOCUMENTS

| | | | |
|---|---|---|---|
| 2,387,730 | 10/1945 | Alderson, Jr. | 260/94 |
| 2,495,286 | 1/1950 | Brubaker | 260/63 |
| 2,833,740 | 5/1958 | Verbanc | 260/45.5 |
| 3,780,140 | 12/1973 | Hammer | 260/884 |
| 3,873,494 | 3/1975 | Lewis | 260/42.37 |
| 4,157,428 | 6/1979 | Hammer | 521/138 |

FOREIGN PATENT DOCUMENTS

| | | |
|---|---|---|
| 1459666 | 12/1976 | United Kingdom . |
| 2014153 | 8/1979 | United Kingdom . |
| 1552352 | 9/1979 | United Kingdom . |

*Primary Examiner*—Morton Foelak

[57] ABSTRACT

A crosslinked closed-cell microcellular article of a terpolymer of ethylene, carbon monoxide, and a softening monomer.

4 Claims, No Drawings

FAST-CURING FOAMABLE COMPOSITION BASED ON ETHYLENE TERPOLYMERS

This is a division of application Ser. No. 303,479, filed Sept. 18, 1981, now U.S. Pat. No. 4,370,423.

BACKGROUND OF THE INVENTION

The subject invention relates to ethylene based polymers which are foamed and cured to form low density closed cell microcellular articles.

It is well known in the art that heating a composition containing a copolymer of ethylene with vinyl acetate, a chemical crosslinking agent and a chemical blowing agent in a pressurized mold mill crosslink the copolymer and decompose the foaming agent so that on opening the mold the composition expands into a closed cell microcellular foam. Articles such as flat shoe soles, foamed matting and recreation vehicle fenders are manufactured in this way.

During the molding process, the composition reaches a suitable degree of cure before the pressure is released and the mold opened. It the mold is opened before the necessary degree of cure is reached, the polymer network is not strong enough to contain the now gaseous foaming agent and the article collapses as the gas escapes from the molten mass.

Using the conventional ethylene/vinyl acetate composition employed in the manufacture of foamed articles in the past, mold time generally is about one minute for each millimeter of thickness of unfoamed material at about 165° C. A mold time of 15 minutes is not uncommon. The cost of this molding process being a considerable percentage of the total cost of the molded piece, the ability to run a faster mold cycle would increase production rate and consequently decrease the cost of the foamed end product. It is not possible to use a higher temperature to accelerate the curing of the usual thick molded articles, any higher temperature tending to result in the outer portion of the composition becoming overcured and the inner portion undercured. To have maximum utility, the foam must be resilient but provide support, have good tear strength, abrasion resistance and be low cost.

SUMMARY OF THE INVENTION

The subject invention employs an ethylene terpolymer composition to obtain a foamed product with a significantly shorter molding cycle than the molding cycle required when a conventional ethylene/vinyl acetate copolymer is employed.

The foamable composition comprises a terpolymer of ethylene, 10 to 40 percent by weight of a softening monomer selected from the group consisting of alkyl acrylates and methacrylates having linear or branched alkyl groups of 1 to 18 carbon atoms, vinyl esters of saturated carboxylic acids having 1 to 18 carbon atoms and vinyl alkyl ethers wherein the alkyl group contains 1 to 18 carbon atoms, and 1.0 to 20 percent by weight carbon monoxide; a free radical crosslinking agent; and a chemical blowing agent. Preferably, the composition may contain fillers such as silica or clay, unsaturated polymers such as natural rubber, saturated polymers such as polyethylene, accelerators for the foaming agent and/or the peroxide, colorants and suitable mold lubricants. Such a composition processes well on conventional rubber processing equipment.

The resulting crosslinked closed-cell microcellular foamed article comprising a terpolymer of ethylene, 10 to 40 weight percent of a softening monomer, and 1 to 20 weight percent carbon monoxide has a bulk density of at least 0.02 g/cm$^3$.

DETAILED DESCRIPTION OF THE INVENTION

The foamable ethylene based terpolymer of the subject invention comprises ethylene, 10 to 40 weight percent of a softening monomer selected from the group consisting of alkyl acrylates and methacrylates having linear of branched alkyl groups of 1 to 18 carbon atoms, vinyl esters of saturated carboxylic acids having 1 to 18 carbon atoms and vinyl alkyl ethers wherein the alkyl group contains 1 to 18 carbon atoms, common examples including vinyl acetate, methyl acrylate, isobutyl acrylate and methyl vinyl ether and 1.0 to 20 percent by weight carbon monoxide; a free radical crosslinking agent; and a chemical blowing agent. The melt index of the terpolymer need be about 0.5 to 500 and preferably 1.0 to 50 as the cure rate is faster for the lower melt index terpolymers. Terpolymers containing greater than about 20 percent CO are difficult to produce. A preferred terpolymer contains about 15 to 30 percent by weight vinyl acetate and has a relatively low melt index of about 2.5. Terpolymers containing less vinyl acetate may be used but the foamed articles made therefrom are less compliant. Terpolymers of higher vinyl acetate content may also be used, however, they are more costly and generally do not provide a sufficient improvement in properties to justify the cost.

An exemplary list of free radical crosslinking agents useful in the practice of the subject invention include, inter alia, peroxide curing agents such as dicumyl peroxide; 1,1-bis(tert-butylperoxy)diisopropylbenzene; 1,3-bis(tert-butyl-peroxyisopropyl)benzene; 2,5-dimethyl-2,5-bis(tert-butylperoxy)hexyne-3; 1,1-bis(tert-butylperoxy)-3,3,5-trimethyl cyclohexane; 2,5-dimethyl-2,5-di-tert-butylperoxy hexane; 2,5-dimethyl-2,5 di-tert-butylperoxy hexyne-3; and "n"-butyl 4,4-bis(tert-butylperoxy) valerate. Other curing agents, however, will be evident to those skilled in the art. These curing agents should be added to the foamable composition in an amount ranging from about 0.2 to 5.0 percent based on the weight of the composition. After crosslinking, the composition retains a certain amount of thermoplasticity and any waste can be reused in a homogeneous blend to improve moldability and crosslinking efficiency.

The chemical blowing agent, for example, an azodicarbonamide blowing agent, should be added to the composition in an amount ranging from about 0.5 to 20 percent based on the weight of the composition.

Although not essential components of the composition of the subject invention, a number of additional ingredients are generally added to a foaming composition in commercial operations. Exemplary of these are fillers such as silica or clay used to reduce the cost of the finished article and to provide strength, unsaturated polymers such as natural rubber in amounts up to 50 percent by weight of the polymer to somewhat shorten the molding time and reduce the cost of the end product, saturated polymers such as polyethylene to reduce the cost of the end product, accelerators such as zinc oxide, N,N'-m-phenylenedimaleimide and pentaerythritol, colorants and suitable mold lubricants.

In the foaming process, the composition is first intimately mixed in the molten state in a conventional mixer such as a Banbury mixer, two roll mill or a combination of the two, or an extruder. It is essential that the mixing temperature be kept below the decomposition temperature of the blowing agent and the free radical crosslinking agent, generally about 120° C.

After mixing, the composition is placed in a hot compression mold and the platen pressure thereon raised to a pressure sufficient to contain the product in the mold, generally about 23 MPa. The molds used are bevelled outward toward the top of the mold so that the foamed article rises easily out of the mold. Upon pressurization, the foaming agent decomposes to produce small nitrogen bubbles throughout the composition. A preferred chemical blowing agent is an azodicarbonamide blowing agent which has a decomposition temperature of 200°–215° C. alone or 130°–155° C. in the presence of a zinc oxide catalyst.

During the heating in the mold, the peroxide also decomposes to produce free radicals which effect crosslinking of the polymer. A preferred peroxide for purposes of the subject invention is one which displays negligible decomposition at processing temperatures, i.e., less than 120° C., while decomposing at molding temperatures, i.e., above about 150° C.

The minimum time required for adequate curing of the composition is determined by subjective trial and error methods. That is, when the mold is opened and the foamed article removed, undercure is evidenced by a splitting of the foam resulting from the foam's inability to retain the gases formed by decomposition of the blowing agent. A sufficiently cured foamed article is one which will withstand this internal gas pressure without rupture of its individual closed cells when released from the mold, generally having a density of at least 0.02 g/cm³. If a very rigid foamed article is desired, of course, the cure time can be increased accordingly.

Upon molding terpolymer compositions of the subject invention containing more than about 5 percent carbon monoxide, various degrees of surface cracking may be evidenced. To alleviate this cracking, a small quantity of peroxide may be added to the composition at the start of the mixing operation, the remainder of the peroxide added at the end of the mixing operation, a trifunctional cocuring agent such as triallyl cyanurate can be added to the composition or mixed peroxides can be used, i.e., 75% conventional peroxide and 25% a more active peroxide.

The advantages of the foamable composition of the subject invention will become more apparent with reference to the examples that follow.

EXAMPLE I

This example shows that the ethylene/vinyl acetate/CO terpolymer of the subject invention cures at a significantly faster rate than the ethylene/vinyl acetate copolymer of the prior art.

After blending a masterbatch of 50 parts polyethylene and 50 parts natural crepe rubber in a 3A Banbury blender, the following two compositions were prepared:

| Composition A: (percentages are by weight) | |
| --- | --- |
| Ethylene/28% vinyl acetate/3% CO terpolymer with melt index of 30 | 41% |
| Masticated crepe rubber | 6% |
| Masterbatch polyethylene/crepe rubber | 23% |
| Zinc Oxide | 1% |

| -continued | |
| --- | --- |
| Stearic Acid | 2% |
| Silica ("Hi-Sil" 215 sold by PPG Industries) | .8% |
| Clay ("Nulock" 321 sold by H.M. Huber Corp.) | 16% |
| Peroxide ("Percadox" 1440 sold by Minerals & Chemicals Ltd.) | 1% |
| Blowing Agent (azodicarbonidamide "Celogen" AZ 130 sold by Uniroyal Chemical Corp.) | 2% |

Comparative Composition B:
Identical except replace ethylene/vinyl acetate/CO terpolymer with ethylene/28% vinyl acetate copolymer (melt index of 6).

The compositions were well mixed on a Banbury mixer for about 8 minutes, dropped onto a 152 cm roll mill, held on the roll mill for about 20 minutes to insure proper mixing and sheeted out. After cutting the sheets into 53×92 cm pieces, the pieces were placed in a five leaf compression mold with a preset mold temperature of 160° C. The molds were closed and pressurized to a maximum pressure of about 11 MPa and then opened to release any entrapped air. The molds were then presurized again to a maximum pressure of about 22.5 MPa and held until desired cure was achieved. The results are tabulated below.

| | Minimum Cure Time | Density (gm/cm³) |
| --- | --- | --- |
| Composition A | 8 min. | .24 |
| Composition B | 12 min. | .20 |

EXAMPLE II

This example shows that softening comonomers other than vinyl acetate can be used in the practice of the subject invention.

The procedure of Example I was repeated here using the following formulations (percentages are by weight):

| (a) | Polymer | 56% |
| --- | --- | --- |
| | Masticated crepe rubber | 11% |
| | Silica ("Hi-Sil" 233) | 17% |
| | Clay ("Satintone" Englehard Corp.) | 7% |
| | Stearic acid | 0.5% |
| | Zinc oxide | 2% |
| | Blowing agent ("Celogen" AZ 130) | 3.5% |
| | Peroxide ("Vul-Cup" 40KE, an 1,1-bis(tert-butylperoxy)diisopropylbenzene sold by Hercules) | 2% |

The following results were obtained:

| Polymer | Minimum Cure Time (min) | Density (gm/cm³) |
| --- | --- | --- |
| Ethylene/30% vinyl acetate with melt index of 6 (control) | 18 | .14 |
| Ethylene/28% methyl acrylate/ 3.9% CO with melt index of 6 | 12 | .28 |

| (b) | Polymer | 53% |
| --- | --- | --- |

-continued

| Polymer | Minimum Cure Time (min) | Density (gm/cm³) |
|---|---|---|
| Masticated crepe rubber | | 16% |
| Silica ("Hi-Sil" 233) | | 16% |
| Clay ("Satintone") | | 7% |
| Stearic acid | | 0.5% |
| Zinc oxide | | 2.0% |
| Foaming agent ("Celogen" AZ 130) | | 3.5% |
| Peroxide ("Vul-Cup" 40KE) | | 2.0% |

The following results were obtained:

| Polymer | Minimum Cure Time (min) | Density (gm/cm³) |
|---|---|---|
| Ethylene/25% vinyl acetate (control) with melt index of 2 | 17 | .16 |
| Ethylene/26% isobutyl acrylate/ 3.1% CO (IBA blended with 25 weight percent of ethylene/ 25% vinyl acetate to increase melt index to 2.4 for proper comparison with control) | 12 | .21 |

EXAMPLE III

This example is also to illustrate that the composition of the subject invention cures faster than conventional foamable compositions. Further, it illustrates that the various fillers, employed commercially as well as in the previous examples, are not essential components of the foamable composition of the subject invention.

The molding process of Examples I and II was repeated here at 190° C. using the following compositions (percentages are by weight):

| Polymer | 92.6% |
|---|---|
| Blowing agent ("Celogen" AZ 130) | 6.2% |
| Peroxide ("Vul-Cup" 40KE) | 1.2% |

| Polymer | Minimum Cure Time (min) | Density (gm/cm³) |
|---|---|---|
| Ethylene/23% vinyl acetate (control) (melt index of 20) | 20.0* | .07 |
| Ethylene/28% vinyl acetate/ 3% CO (melt index of 20) | 16.0 | .12 |

*Not fully cured at 20 minute cure time

I claim:

1. A crosslinked closed-cell microcellular foamed article with bulk density of at least 0.02 g/cm³ comprising a terpolymer of
   (i) ethylene;
   (ii) 10 to 40 percent by weight of a softening monomer selected from the group consisting of alkyl acrylates and methylacrylates having linear or branched alkyl groups of 1 to 18 carbon atoms, vinyl esters of saturated carboxylic acids having 1 to 18 carbon atoms and vinyl alkyl ethers wherein the alkyl group contains 1 to 18 carbon atoms; and
   (iii) 1.0 to 20 percent by weight carbon monoxide.

2. The foamed article of claim 1 wherein is present less than 50 percent by weight natural rubber.

3. The foamed article of claim 1 or claim 2 wherein the softening monomer is selected from the group consisting of vinyl acetate, methyl acrylate, isobutyl acrylate and methyl vinyl ether.

4. The foamed article of claim 1 or claim 2 wherein the softening monomer is vinyl acetate present in an amount equal to 15 to 30 percent by weight of the terpolymer.

* * * * *

UNITED STATES PATENT AND TRADEMARK OFFICE
CERTIFICATE OF CORRECTION

PATENT NO.   : 4,394,459
DATED        : July 19, 1983
INVENTOR(S)  : John Rys-Sikora It is certified that error appears in the above-identified patent and that said Letters Patent is hereby corrected as shown below:

The title should be changed to read -- ARTICLES FROM FAST-CURING COMPOSITION BASED ON ETHYLENE TERPOLYMERS --.

Item [73] should read -- Bata Limited
                         Toronto, Ontario Canada --.

*Signed and Sealed this*

*Twenty-second* Day of *November 1983*

[SEAL]

*Attest:*

GERALD J. MOSSINGHOFF

*Attesting Officer*   *Commissioner of Patents and Trademarks*